(12) United States Patent
Shioyasu et al.

(10) Patent No.: US 8,374,515 B2
(45) Date of Patent: Feb. 12, 2013

(54) IMAGE FORMING SYSTEM, IMAGE FORMING APPARATUS, AND COMPUTER READABLE MEDIUM

(75) Inventors: Asahito Shioyasu, Kanagawa (JP); Shinho Ikeda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 459 days.

(21) Appl. No.: 12/697,791

(22) Filed: Feb. 1, 2010

(65) Prior Publication Data
US 2011/0058822 A1 Mar. 10, 2011

(30) Foreign Application Priority Data
Sep. 4, 2009 (JP) ................................. 2009-204843

(51) Int. Cl.
*G03G 15/08* (2006.01)
*G03G 15/00* (2006.01)
(52) U.S. Cl. .................. 399/8; 399/37; 399/88
(58) Field of Classification Search .............. 399/8, 88, 399/37; 358/1.14
See application file for complete search history.

(56) References Cited

FOREIGN PATENT DOCUMENTS
JP 2002-297357 A 10/2002
JP 2006-146360 A 6/2006

*Primary Examiner* — David Gray
*Assistant Examiner* — Erika J Villaluna
(74) *Attorney, Agent, or Firm* — Sughrue Mion, PLLC (57) ABSTRACT

An image forming system includes image forming apparatuses that communicate with each other via a network. Each of the image forming apparatuses includes a network computer, a power saving controller for applying a power saving control in a first power saving mode in which a supply of power to a printing function portion that forms an image on a sheet is stopped and a power is fed to the network controller when the apparatus acts as a main apparatus, and applying a power saving control in a second power saving mode in which a supply of power to the printing function portion and the network controller is stopped when the apparatus acts as subordinate apparatus, and a main apparatus deciding unit for deciding the image forming apparatus out of the plurality of image forming apparatuses based on a calculation of power consumption of the plurality of image forming apparatuses.

12 Claims, 9 Drawing Sheets

A: ENERGY SAVING STATE  B: ENERGY SAVING STATE  C: STANDBY/RUN STATE

*FIG. 4B*

POWER CONSUMPTION CALCULATING TABLE

|  | IP ADDRESS | POWER CONSUMPTION | | |
|---|---|---|---|---|
|  |  | SHALLOW ENERGY SAVING | DEEP ENERGY SAVING | STANDBY/RUN STATE |
| MULTIFUNCTION PERIPHERAL A | 192.168.0.1 | 10W | 2W | 15W |
| MULTIFUNCTION PERIPHERAL B | 192.168.0.2 | 8W | 2W | 13W |
| MULTIFUNCTION PERIPHERAL C | 192.168.0.3 | 8W | 1W | 13W |

*FIG. 4C* THE CASE WHERE A ACTS AS A MASTER (A: SHALLOW ENERGY SAVING, B: DEEP ENERGY SAVING, C: STANDBY)

10 + 2 + 13 = 25 (W)

*FIG. 4D* THE CASE WHERE B ACTS AS A MASTER (A: DEEP ENERGY SAVING, B: SHALLOW ENERGY SAVING, C: STANDBY)

2 + 8 + 13 = 23 (W)

*FIG. 4E* THE CASE WHERE C ACTS AS A MASTER (A: DEEP ENERGY SAVING, B: DEEP ENERGY SAVING, C: STANDBY)

2 + 2 + 13 = 17 (W)

∴ C IS DECIDED AS A MASTER

IMAGE FORMING SYSTEM, IMAGE FORMING APPARATUS, AND COMPUTER READABLE MEDIUM

CROSS-REFERENCE TO RELATED APPLICATION

This application is based on and claims priority under 35 USC 119 from Japanese Patent Application No. 2009-204843 filed on Sep. 4, 2009.

BACKGROUND

1. Technical Field

The present invention relates to an image forming system, an image forming apparatus, and a computer readable medium.

2. Related Art

In the power supply states of the device, there exists a state that is called a power conservation mode (power saving state) used to economize on a consumed power.

In the power saving state, when a state in which no operation is applied (standby state) is continued for a predetermined time after a standby/run state in which the major operations of the device are applied, the supply of power to unnecessary portions in the device is cut off to economize a power consumption.

Then, in the device connected to the network, as the power saving state, there are the power saving state in which the supply of power to the network circuit is applied (shallow energy saving state) and the power saving state in which the supply of power to the network circuit is not applied (deep energy saving state).

Also, the browsing function capable of identifying the information processing equipment on a network by using common use data (browse list) between a plurality of information processing equipments on the network is known.

SUMMARY

According to an aspect of the invention, an image forming system, includes: a plurality of image forming apparatuses that communicate with each other via a network; wherein operation states of respective image forming apparatuses are switched in the network such that one image forming apparatus acts as a main apparatus and other image forming apparatuses act as subordinate apparatus, and each of the image forming apparatuses includes a network controller that controls a communication with another image forming apparatus, a power saving controller that applies a power saving control in a first power saving mode in which a supply of power to a printing function portion that forms an image on a sheet is stopped and a power is fed to the network controller when the apparatus acts as the main apparatus, and applying a power saving control in a second power saving mode in which a supply of power to the printing function portion and the network controller is stopped when the apparatus acts as the subordinate apparatus, and a main apparatus deciding unit that decides the image forming apparatus, which acts next as the main apparatus, out of the plurality of image forming apparatuses based on a calculation of power consumption of the plurality of image forming apparatuses when a power state of any image forming apparatus of the plurality of image forming apparatuses shifts from either the first power saving mode or the second power saving mode to a non-power saving mode in which a power is fed to the printing function portion and the network controller or when a power state of any image forming apparatus of the plurality of image forming apparatuses shifts from the non-power saving mode to either the first power saving mode or the second power saving mode, and wherein the image forming apparatus decided by the main apparatus deciding unit acts as the main apparatus after the image forming apparatus acting as the main apparatus is decided by the main apparatus deciding unit.

BRIEF DESCRIPTION OF THE DRAWINGS

Embodiments of the invention will be described in detail based on the following figures, wherein.

DETAILED DESCRIPTION

An embodiment of the present invention will be explained in detail with reference to the accompanying drawings hereinafter.

First, explanation of a network system 1 according to the present invention will be made with reference to FIG. 1 hereunder.

Figure 1:
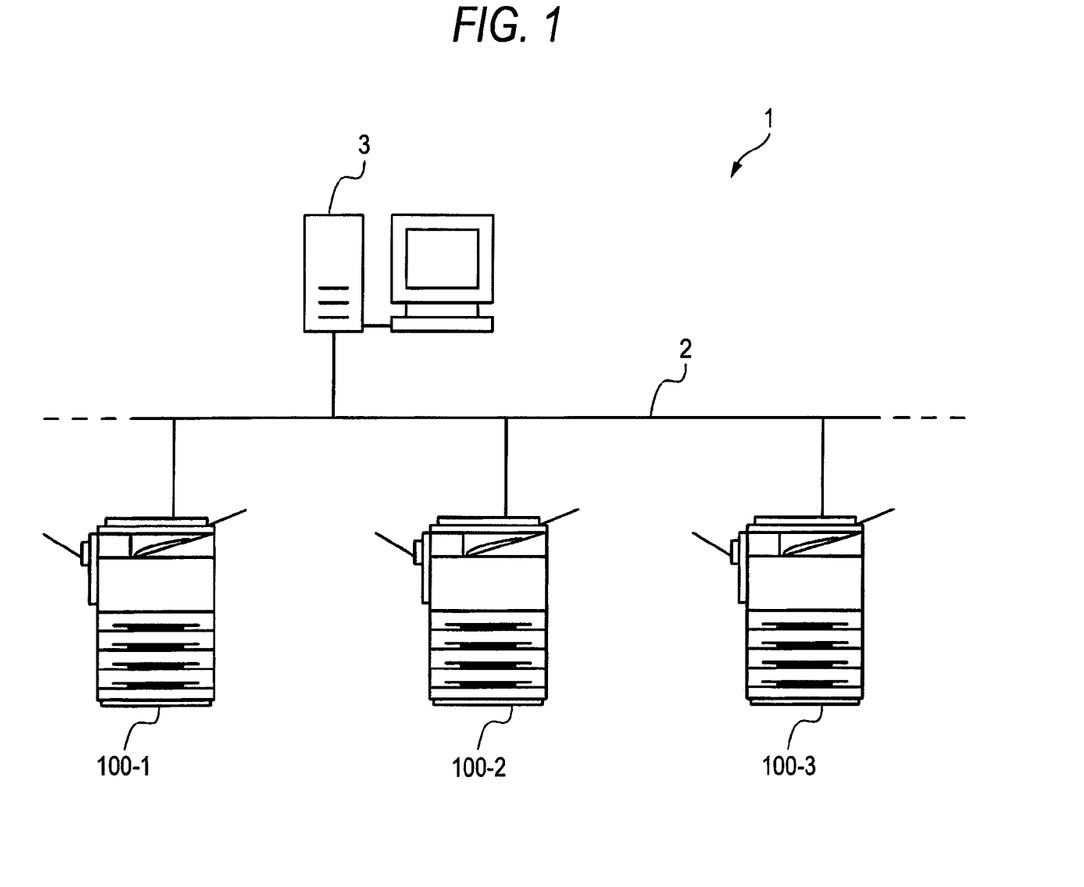
FIG. 1 is a schematic view showing a configuration of a network system 1.

FIG. 1 is a schematic view showing a configuration of a network system 1.

In a network system 1, a multifunction peripheral 100 as an example of the information processing equipment equipped with a power saving function is connected in plural to a communication line 2.

The multifunction peripheral 100 has a browsing function that can identify a list of the information processing equipments (the multifunction peripherals 100, and the like) that are connected to the communication line 2.

Since the browsing function should be carried out, a plurality of multifunction peripherals 100 in the network system 1 are discriminated into a master and slaves.

Only one equipment out of a plurality of multifunction peripherals 100 exits as the master in the network system 1, and other multifunction peripherals 100 act as the slaves.

Also, respective charges of the master and the slaves are dynamically changed.

The multifunction peripheral 100 acting as the master manages the browse list as a tabulated list in which identification information, etc. of the multifunction peripherals 100 connected to the communication line 2 in the network system 1 are recited.

The multifunction peripheral 100 acting as the slave requests the multifunction peripheral 100 acting as the master in checking the multifunction peripherals 100 connected to the communication line 2 to send the browse list. Then, such multifunction peripheral 100 discriminates the multifunction peripherals 100 connected to the communication line 2 based on the browse list acquired from the master.

Based on the calculation results calculated by using a power consumption calculating table that will be explained with reference to FIG. 4B, respective charges of the master and the slaves of the multifunction peripherals 100 in the network system 1 are decided such that the power consumption in the overall network system 1 is lowered.

The multifunction peripheral 100 acting as the slave transmits periodically a host announcement to the multifunction peripheral 100 acting as the master.

When the multifunction peripheral 100 acting as the master receive the host announcement, such multifunction peripheral registers the multifunction peripheral 100 from which the host announcement is received on the browse list.

Also, the multifunction peripheral 100 acting as the master decides the slave that does not send out the host announcement for a predetermined time, as the multifunction peripherals 100 that is not connected to the communication line 2, and then deletes such slave from the browse list.

In this manner, in order to discriminate the list of the information processing equipments (the multifunction peripherals 100, and the like) connected to the communication line 2, the browse list is practically used in the network system 1.

The browse list is the common use data that are used commonly by a plurality of information processing equipments (the multifunction peripherals 100, and the like) in the network system 1.

Also, a plurality of multifunction peripherals 100 connected to the network system 1 are a multifunction peripheral (A) 100-1, a multifunction peripheral (B) 100-2, and a multifunction peripheral (C) 100-3. Also, when the multifunction peripheral (A) 100-1, the multifunction peripheral (B) 100-2, and the multifunction peripheral (C) 100-3 are generically called, these multifunction peripherals are referred to as the multifunction peripherals 100.

Also, in the network system 1, a client PC 3 for transmitting print data to the multifunction peripheral 100 is connected to the communication line 2.

When the client PC 3 generates the print data and then requests the multifunction peripheral 100 to print the data, first the print request in which the identification information of the multifunction peripheral 100 whose print output is desired is sent out to the multifunction peripheral 100 acting as the master in the network system 1.

Then, when the client PC 3 accepts the print request of the print data corresponding to the print request from the multifunction peripheral 100, such client PC 3 transmits the print data to the multifunction peripheral 100.

Next, explanation of a configuration of the multifunction peripheral 100 will be made with reference to FIG. 2 hereunder.

Figure 2:
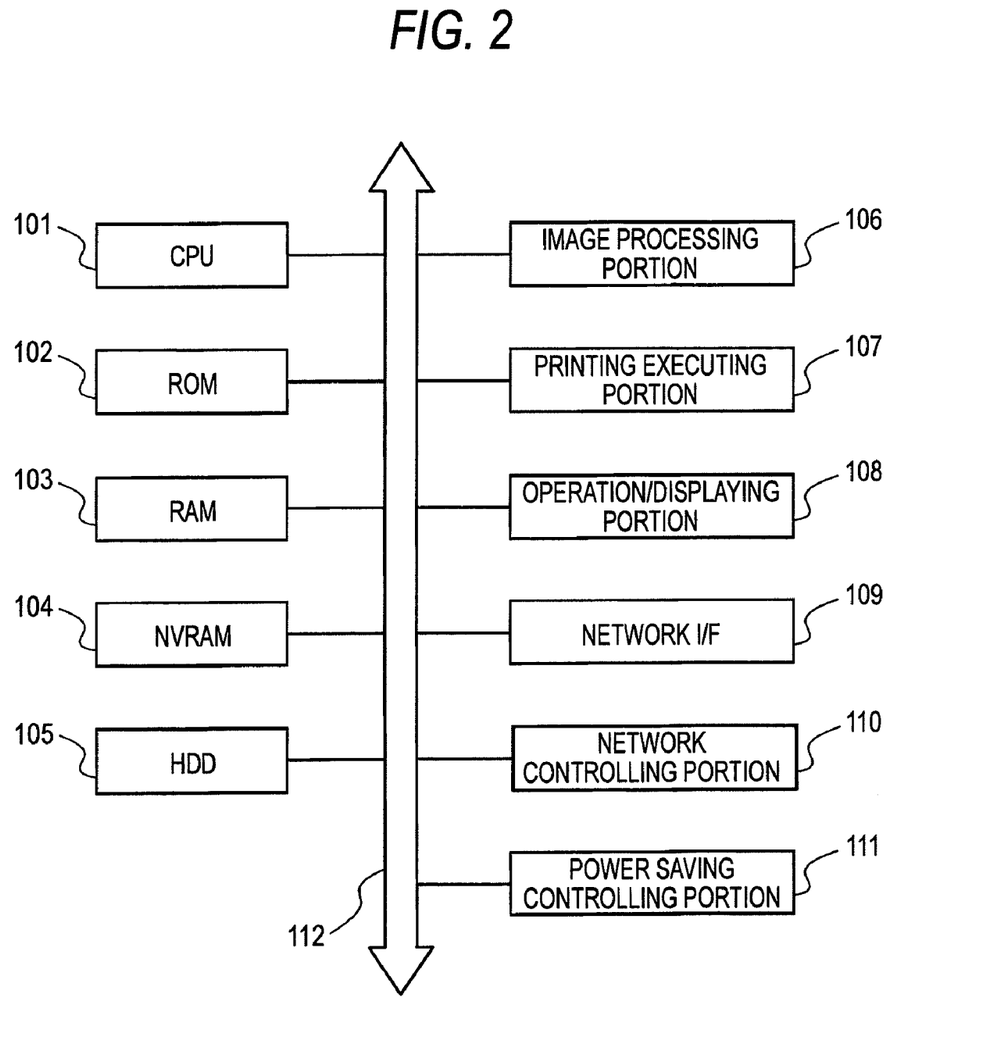
FIG. 2 is a block diagram showing a configuration of a multifunction peripheral 100.

FIG. 2 is a block diagram showing a configuration of the multifunction peripheral 100.

As shown in FIG. 2, the multifunction peripheral 100 is constructed by connecting a CPU (Central Processing Unit) 101, a ROM (Read Only Memory) 102, a RAM (Random Access Memory) 103, a NVRAM (Non-Volatile Memory) 104, a HDD (Hard Disc Drive) 105, an image processing portion 106, a printing executing portion 107, an operating/displaying portion 108, a network interface (referred to as I/F hereinafter) 109, a network controller 110, and a power saving controller 111 to a bus 112.

The CPU 101 executes a main control of functions that are provided to the multifunction peripheral 100. Respective processing portions execute the process based on the command from the CPU 101, and notifies the designated processing portion of the processed result.

The ROM 102 stores various programs used to execute the control of the multifunction peripheral 100, the user's authenticity, the power saving function, the image process, etc., and identification information that the multifunction peripheral 100 possesses uniquely to identify its own equipment. The ROM 102 executes the process while referring to the information stored in the NVRAM 104, or the like in response to the program executing command issued from the CPU 101.

The RAM 103 stores temporarily system variables such as environmental variables, etc. used to operate the program stored in the ROM 102, and data used to execute the image process.

The NVRAM 104 is the nonvolatile memory that can hold the stored contents even after the power supply is shut down. The NVRAM 104 stores not only various parameters used to operate the program called the system data and stored in the RAM 103 but also the history information, the power consumption calculating table, the identification information of the multifunction peripheral 100 acting as the master, and the like.

The HDD 105 stores image data that are subjected to the image process, and the like.

The image processing portion 106 is constructed by ASIC (Application Specific Integrated Circuit), or the like, and executes various image processes of the image data.

The printing executing portion 107 is the print engine that produces the print output of the image data.

The operating/displaying portion 108 is constructed by a liquid crystal touch panel, and executes the process of displaying the information for the user and the process of accepting the instruction from the user.

The network I/F 109 is connected to the communication line 2, and gives/receives the information to/from other multifunction peripheral 100 connected to the communication line 2, receives the print data from the client PC 3, etc.

The network controller 110 is connected via the network I/F 109, and controls respective communications with the multifunction peripheral 100 and the client PC 3 in the network system 1.

The power saving controller 111 is in charge of a function concerning a power saving of the power supply of the multifunction peripheral 100.

The power supply of the multifunction peripheral 100 is managed in three modes, i.e., a standby/run state, a shallow energy saving state, and a deep energy saving state.

The control applied to shift the power supply state of the multifunction peripheral 100 selectively to each of three states, i.e., a standby/run state, a shallow energy saving state, and a deep energy saving state, is executed by the power saving controller 111. Respective states will be explained in detail later with reference to FIG. 3. In this case, both the shallow energy saving state, and the deep energy saving state are the energy saving state in which the power supply is brought into a power saving state after the multifunction peripheral 100 is kept in a standby state for a predetermined time.

Next, explanation of power supply states of the multifunction peripheral 100, which are managed by a power saving controller 111, will be made with reference to FIG. 3 hereunder.

Figure 3:
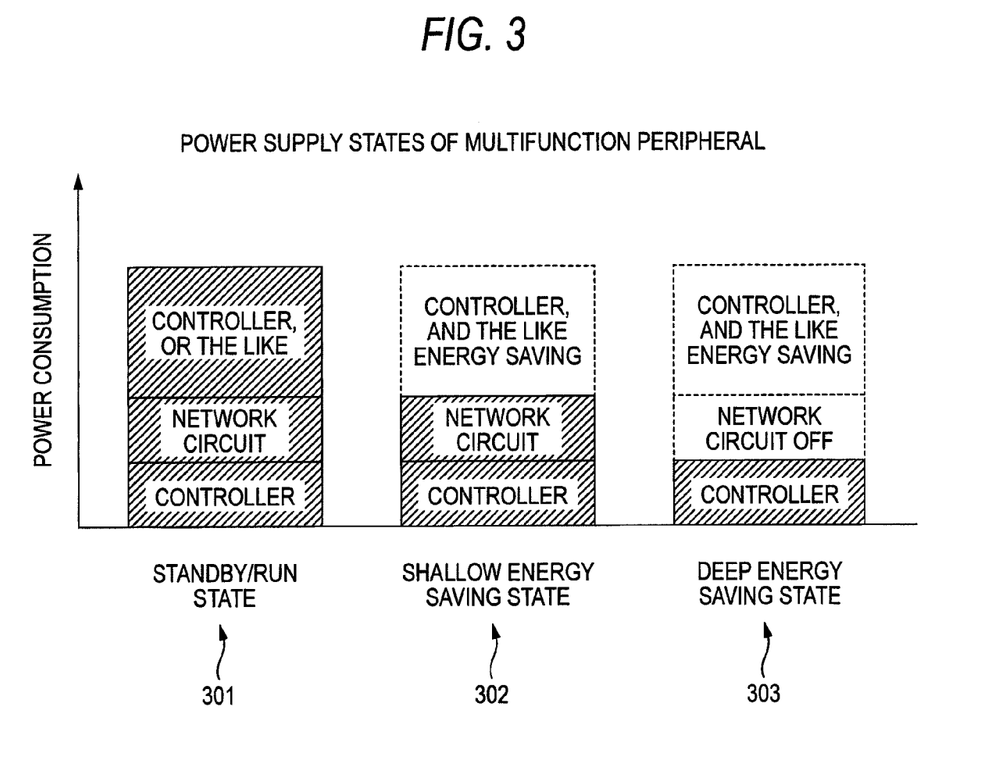
FIG. 3 is a schematic view showing various power supply states of the multifunction peripheral 100.

FIG. 3 is a schematic view showing various power supply states of the multifunction peripheral 100.

As shown in FIG. 3, as the power supply states of the multifunction peripheral 100, there are a standby/run state (reference numeral 301), a shallow energy saving state (reference numeral 302), and a deep energy saving state (reference numeral 303).

The standby/run state corresponds to either an executing state in which the multifunction peripheral 100 executes the image process of the print data, the print output process, etc., or an executable state in which the instructed contents can be executed without a starting time when the operating/displaying portion 108 gives the instruction. In this standby/run state, the power of the network circuit, the controller board, and the printing executing portion 107 is turned ON.

When the instruction from the operating/displaying portion 108 and various processes such as the printing job, and the like are not executed for a predetermined time in the standby/run state, the multifunction peripheral 100 goes to a energy saving state in which the power consumption is saved.

As the energy saving state, there are two types, i.e., the shallow energy saving state and the deep energy saving state. As indicated by the reference numeral 302 in FIG. 3, the shallow energy saving state corresponds to the state in which the power of the network circuit and a part of the controller board is turned ON. Since the power of the network circuit is turned ON, the multifunction peripheral 100 kept in the shallow energy saving state can receive the request of the browse list and the host announcement from other multifunction peripherals 100, and the like connected to the communication line 2.

Also, the deep energy saving state corresponds to the state in which the power consumption is save much more than the shallow energy saving state. In the deep energy saving state, the power of the network circuit is turned OFF but only the power of a part of the controller board is turned ON.

Since the power of the network circuit is turned OFF in the deep energy saving state, the power consumption of the network circuit, which occupies big power consumption even in the energy saving state, can be reduced. Therefore, the effective energy saving state is implemented.

The state in which the power of the network circuit is turned OFF corresponds to the state in which the power of the network I/F 109 and the network controller 110 is turned OFF.

In the energy saving state, the multifunction peripheral 100 acting as the master goes to the shallow energy saving state whereas the multifunction peripheral 100 acting as the slave goes to the deep energy saving state.

The multifunction peripheral 100 stores the identification information of the multifunction peripheral 100 acting as the master in the NVRAM 104. Then, when the multifunction peripheral 100 goes to the energy saving state from the standby/run state, such multifunction peripheral decides whether own equipment is acting as the master or the slave, based on the identification information of the master stored in the NVRAM 104. Then, the multifunction peripherals 100 go to the corresponding energy saving state respectively (the multifunction peripheral acting as the master goes to the shallow energy saving state, while the multifunction peripheral acting as the slave goes to the deep energy saving state).

Next, explanation of calculations done by the power consumption calculating table to decide charges of a master and slaves of the multifunction peripherals 100 in the network system 1 will be made with reference to FIG. 4B hereunder.

Figure 4A:
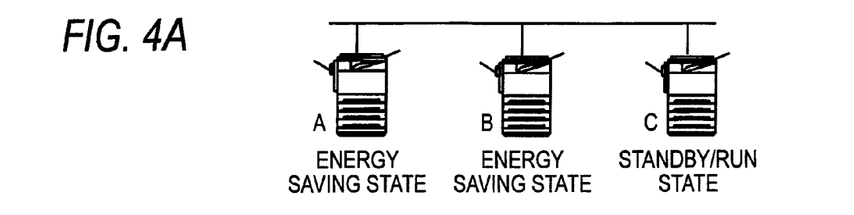
FIG. 4A is a schematic view showing respective power supply states of the multifunction peripherals 100 in the network system 1.
Figure 4B:
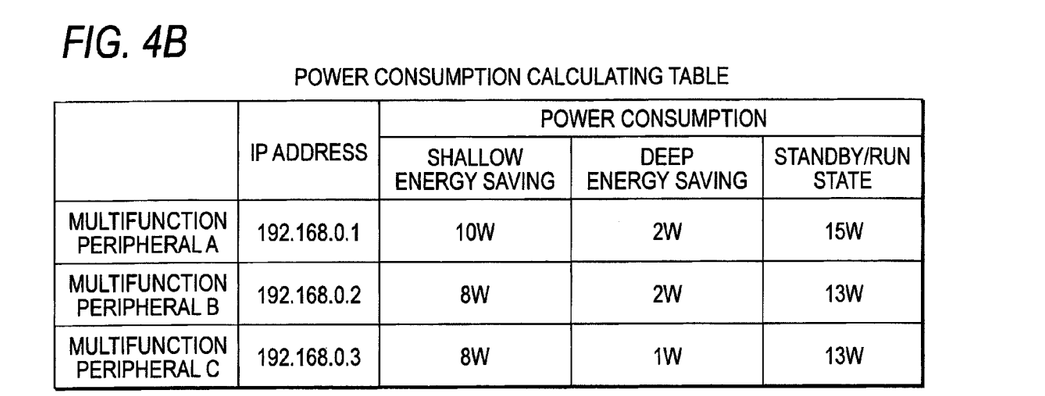
FIG. 4B is a table showing a power consumption calculating table.
Figure 4C:
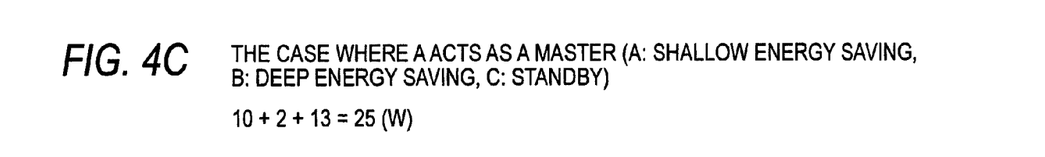
FIG. 4C is a view showing a calculating formula applied when a multifunction peripheral (A) 100-1 acts as a master.
Figure 4D:
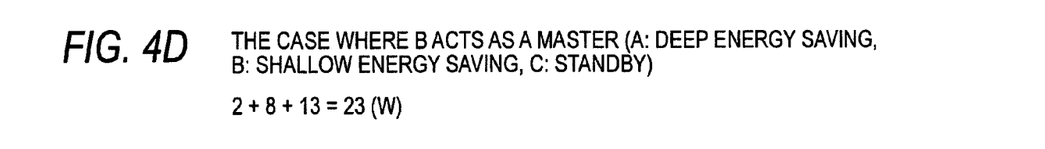
FIG. 4D is a view showing a calculating formula applied when a multifunction peripheral (B) 100-2 acts as a master.
Figure 4E:
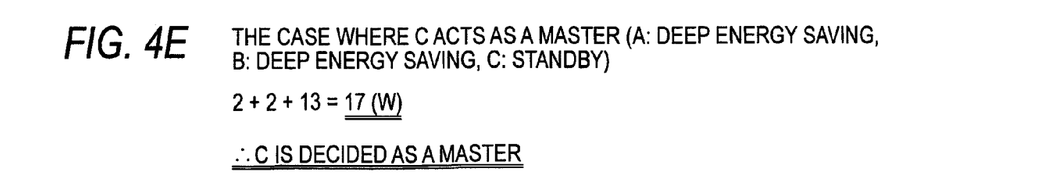
FIG. 4E is a view showing a calculating formula applied when a multifunction peripheral (C) 100-3 acts as a master.

FIG. 4A is a schematic view showing respective power supply states of the multifunction peripherals 100 in the network system 1, FIG. 4B is a table showing a power consumption calculating table, FIG. 4C is a view showing a calculating formula applied when a multifunction peripheral (A) 100-1 acts as a master, FIG. 4D is a view showing a calculating formula applied when a multifunction peripheral (B) 100-2 acts as a master, and FIG. 4E is a view showing a calculating formula applied when a multifunction peripheral (C) 100-3 acts as a master.

As shown in FIG. 4A, when the multifunction peripheral (A) 100-1 is in the energy saving state, the multifunction peripheral (B) 100-2 is in the energy saving state, and the multifunction peripheral (C) 100-3 is in the standby/run state, it is decided by the calculation in the power consumption which one of multifunction peripherals 100 should be chosen as the master such that the power consumption can be reduced smallest as a whole in the network system 1.

The table used in this calculation is the power consumption calculating table.

The power consumption calculating table is stored in the NVRAM 104 of the multifunction peripheral 100 acting as the master.

Also, as shown in FIG. 4B, the IP address of the multifunction peripheral (A) 100-1, and the power consumption consumed in the shallow energy saving state, the deep energy saving state, and the standby/run state of the multifunction peripheral (A) 100-1 respectively are recited in the power consumption calculating table.

As shown in FIG. 4B, not only the information concerning the multifunction peripheral (A) 100-1 but also the IP addresses of the multifunction peripheral (B) 100-2 and the multifunction peripheral (C) 100-3 as other multifunction peripherals 100 and in the network system 1 and the power consumption consumed in the shallow energy saving state, the deep energy saving state, and the standby/run state are recited in the power consumption calculating table.

When respective power supply states of the multifunction peripherals 100 in the network system 1 are set to the states explained by reference to FIG. 4A, the power consumptions are calculated respectively under the assumption that a plurality of multifunction peripherals 100 in the network system 1 act as the master respectively, to decide the multifunction peripheral 100 acting as the master.

As the calculation of the power consumption, the power consumptions of all multifunction peripherals 100 constituting the network system 1 are summed up.

First, the power consumption is calculated under the assumption that the multifunction peripheral (A) 100-1 out of the multifunction peripherals 100 constituting the network system 1 is chosen as the master.

When the multifunction peripheral (A) 100-1 acts as the master, both the multifunction peripheral (B) 100-2 and the multifunction peripheral (C) 100-3 act as the slave respectively.

Then, as respective power supply states of the multifunction peripherals 100 constituting the network system 1 when the multifunction peripheral (A) 100-1 acts as the master, as shown in FIG. 4C, the multifunction peripheral (A) 100-1 is in the shallow energy saving state as the master, the multifunction peripheral (B) 100-2 is in the deep energy saving state as the slave, and the multifunction peripheral (C) 100-3 is in the standby/run state.

Therefore, a total of the power consumptions of the multifunction peripherals 100 constituting the network system 1 when the multifunction peripheral (A) 100-1 acts as the master is given as a total sum of 25 W by summing up 10 W of the multifunction peripheral (A) 100-1, 2 W of the multifunction peripheral (B) 100-2, and 13 W of the multifunction peripheral (C) 100-3.

Then, the power consumption is calculated under the assumption that the multifunction peripheral (B) 100-2 out of the multifunction peripherals 100 constituting the network system 1 is chosen as the master.

When the multifunction peripheral (B) 100-2 acts as the master, both the multifunction peripheral (A) 100-1 and the multifunction peripheral (C) 100-3 act as the slave respectively.

Then, as respective power supply states of the multifunction peripherals 100 constituting the network system 1 when the multifunction peripheral (B) 100-2 acts as the master, as shown in FIG. 4D, the multifunction peripheral (A) 100-1 is in the deep energy saving state as the slave, the multifunction peripheral (B) 100-2 is in the deep energy saving state as the master, and the multifunction peripheral (C) 100-3 is in the standby/run state.

Therefore, a total of the power consumptions of the multifunction peripherals 100 constituting the network system 1 when the multifunction peripheral (B) 100-2 acts as the master is given as a total sum of 23 W by summing up 2 W of the multifunction peripheral (A) 100-1, 8 W of the multifunction peripheral (B) 100-2, and 13 W of the multifunction peripheral (C) 100-3.

Then, the power consumption is calculated under the assumption that the multifunction peripheral (C) 100-3 out of the multifunction peripherals 100 constituting the network system 1 is chosen as the master.

When the multifunction peripheral (C) 100-3 acts as the master, both the multifunction peripheral (A) 100-1 and the multifunction peripheral (B) 100-2 act as the slave respectively.

Then, as respective power supply states of the multifunction peripherals 100 constituting the network system 1 when the multifunction peripheral (C) 100-3 acts as the master, as shown in FIG. 4E, the multifunction peripheral (A) 100-1 is in the deep energy saving state as the slave, the multifunction peripheral (B) 100-2 is in the deep energy saving state as the slave, and the multifunction peripheral (C) 100-3 is in the standby/run state.

Therefore, a total of the power consumptions of the multifunction peripherals 100 constituting the network system 1 when the multifunction peripheral (C) 100-3 acts as the master is given as a total sum of 17 W by summing up 2 W of the multifunction peripheral (A) 100-1, 2 W of the multifunction peripheral (B) 100-2, and 13 W of the multifunction peripheral (C) 100-3.

In this manner, when a total of the power consumptions of the multifunction peripherals 100 constituting the network system 1 is calculated under the assumption that each of a plurality of multifunction peripherals 100 constituting the network system 1 acts as the master respectively, it is decided that, when the multifunction peripheral (C) 100-3 acts as the master, a total of the power consumptions of the multifunction peripherals 100 constituting the network system 1 is smallest.

Therefore, as shown in FIG. 4A, when the multifunction peripheral (A) 100-1 is in the energy saving state, the multifunction peripheral (B) 100-2 is in the energy saving state, and the multifunction peripheral (C) 100-3 is in the standby/run state, the multifunction peripheral (C) 100-3 is decided as the master and both the multifunction peripheral (A) 100-1 and the multifunction peripheral (B) 100-2 are decided as the slave.

Such calculation to decide the master is executed by the CPU 101, based on the power consumption calculating table stored in the NVRAM 104.

Next, explanation of a process in the multifunction peripheral 100 acting as a master in the network system 1 will be made with reference to FIG. 5 hereunder.

Figure 5:
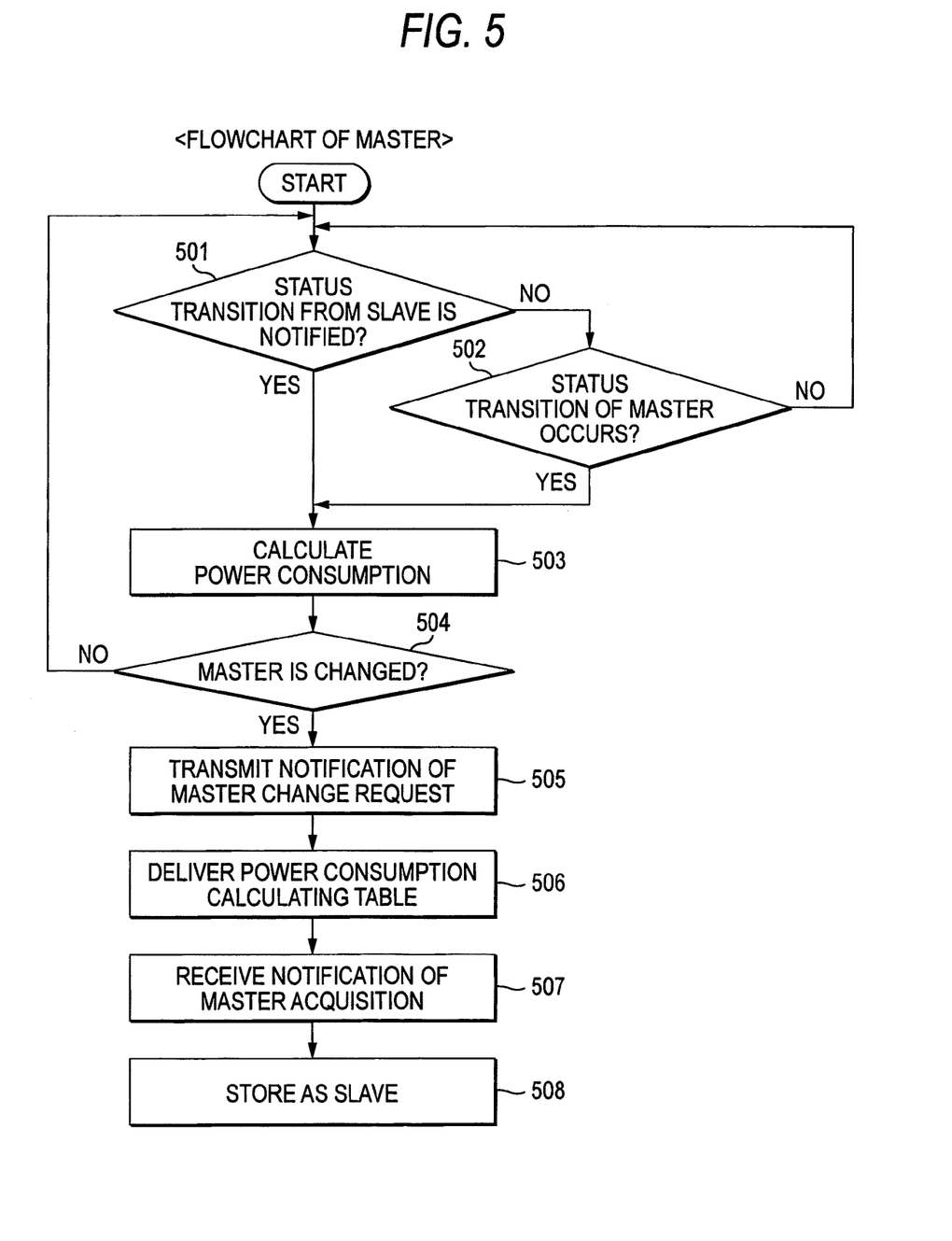
FIG. 5 is a flowchart showing a process in the multifunction peripheral 100 acting as a master.

FIG. 5 is a flowchart showing a process in the multifunction peripheral 100 acting as a master in the network system 1.

The power supply state of the multifunction peripheral 100 acting as the master is in either the standby/run state or the shallow energy saving state.

Then, as shown in FIG. 5, if a notification of status transition is received from the multifunction peripheral 100 acting as the slave (YES in step 501) or a status transition of its own equipment occurs (YES in step 502) in such a situation that the power supply state is in either the standby/run state or the shallow energy saving state, the multifunction peripheral 100 acting as the master calculates the power consumption based on the power consumption calculating table and decides the next master (step 503).

Figure 6:
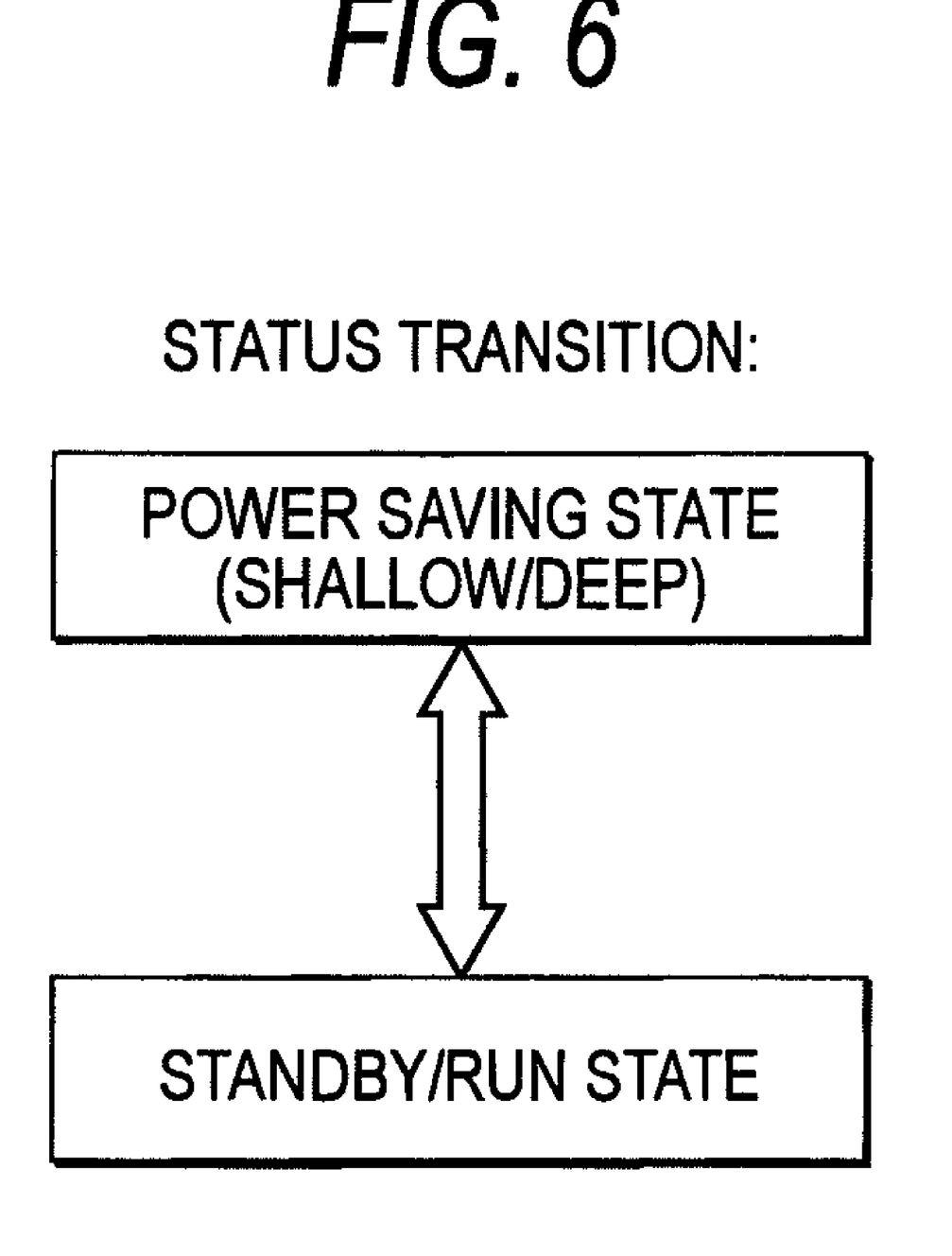
FIG. 6 is a view showing a status transition.

Here, the "status transition" denotes that, as shown in FIG. 6, the power supply state of the multifunction peripheral 100 is shifted from the power saving state to the standby/run state or is shifted from the standby/run state to the energy saving state.

Also, the "notification of status transition" sent from the multifunction peripheral 100 acting as the slave denotes the notification that is sent from the multifunction peripheral 100 acting as the slave, in which the status transition occurs, to the multifunction peripheral 100 acting as the master when the status transition occurs in the multifunction peripheral 100 acting as the slave, to indicate the effect that "the state of the multifunction peripheral 100 as the slave is shifted".

Also, the "calculation of the power consumption based on the power consumption calculating table" in step 503 denotes the calculation that is explained with reference to FIG. 4C to FIG. 4E and is used to decide the multifunction peripheral 100 acting as the next master.

If the multifunction peripheral 100 that is different from its own equipment is decided as the next master based on the calculated result (YES in step 504) after the calculation to decide the multifunction peripheral 100 acting as the master is executed in step 503, the multifunction peripheral 100 acting as the mater (own equipment) transmits a notification of master change request to the multifunction peripheral 100 that is acting as the slave and is decided as the next master (step 505).

Then, the multifunction peripheral 100 acting as the master transmits the power consumption calculating table stored in the NVRAM 104 to the multifunction peripheral 100 that is acting as the slave and is decided as the next master in step 503 (step 506).

When the multifunction peripheral 100 that is acting as the slave and is decided as the next master receives the notification of master change request and the power consumption calculating table in the processes in steps 505, 506 from the multifunction peripheral 100 acting as the master, such multifunction peripheral 100 broadcasts the notification of master acquisition to the multifunction peripherals 100 in the network system 1 except its own equipment.

In the notification of master acquisition, the identification information of the multifunction peripheral 100 that broadcasts the notification of master acquisition (the multifunction peripheral 100 chosen as the master) is recited.

The multifunction peripheral 100 that receives the broadcasted notification of master acquisition stores the identification information of the multifunction peripheral 100, which is recited in the notification of master acquisition and acts as the next master from now, in the NVRAM 104 as the identification information of the multifunction peripheral 100 acting as the master.

Then, the multifunction peripheral 100 that transmitted the notification of master acquisition and the power consumption calculating table in steps 505, 506 and acted as the former master receives the broadcasted notification of master acquisition (step 507). Then, such multifunction peripheral 100 stores the identification information of the multifunction peripheral 100, which is recited in the notification of master acquisition and acts as the next master from now, in the NVRAM 104 as the identification information of the multifunction peripheral 100 acting as the master (step 508).

If the master is not changed (NO in step 504) when the multifunction peripheral 100, which executed the calculation of the power consumption and is acting as the master, is decided as the master as the result of the calculation of the power consumption executed to decide the multifunction peripheral 100 acting as the next master in step 503, the process of waiting the notification of status change issued from the slave in step 501 or the process of waiting its own status change of the master in step 502 is executed.

In this manner, if the notification of status transition is received from the slave (YES in step 501) or the status transition of its own equipment occurs (YES in step 502), the multifunction peripheral 100 acting as the master executes the calculation of the power consumption based on the power consumption calculating table and decides the next master.

Next, explanation of a process in the multifunction peripheral 100 acting as a slave in the network system 1 will be made with reference to FIG. 7 hereunder.

Figure 7:
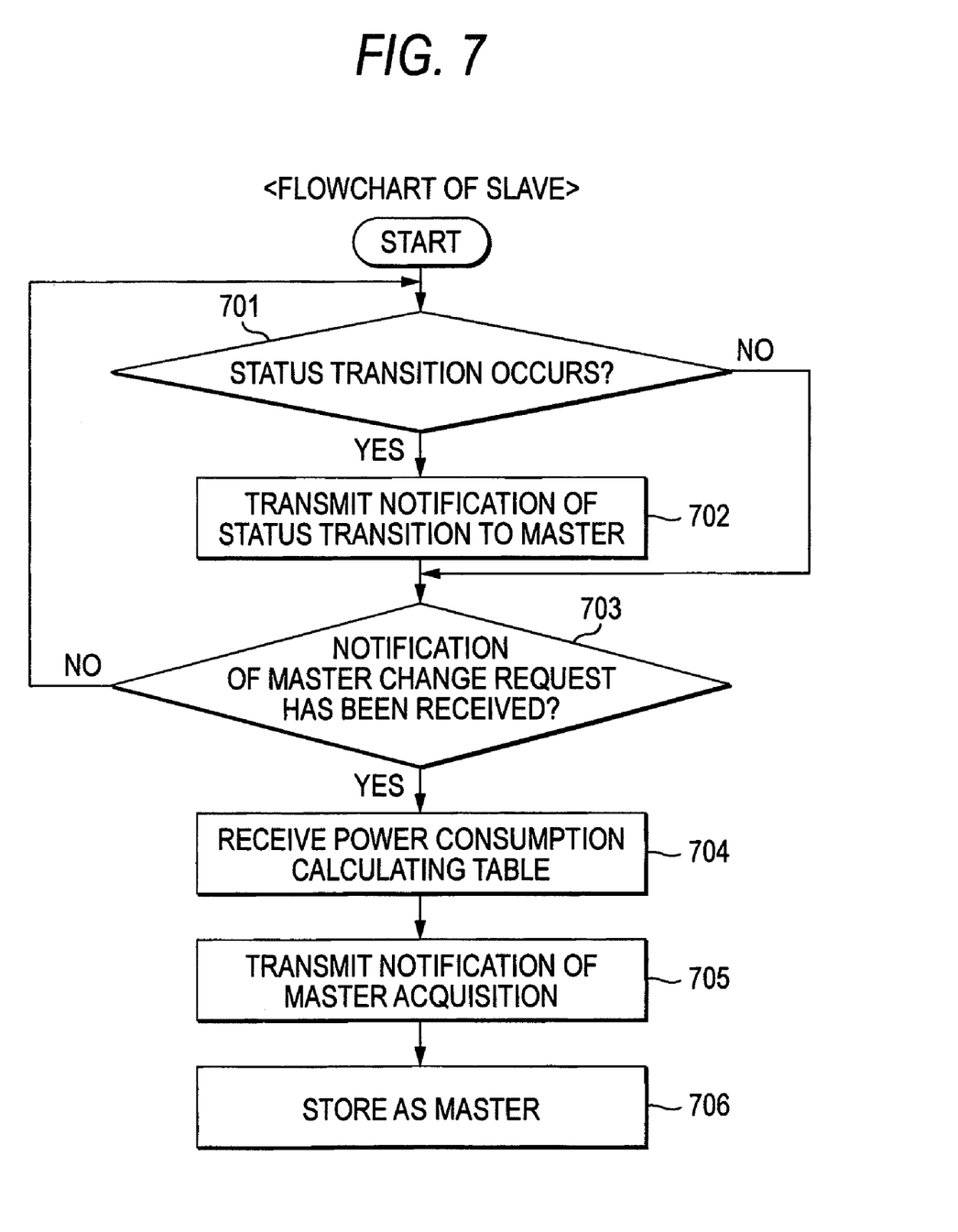
FIG. 7 is a flowchart showing a process in the multifunction peripheral 100 acting as a slave.

FIG. 7 is a flowchart showing a process in the multifunction peripheral 100 acting as a slave in the network system 1.

The multifunction peripheral 100 acting as the slave is in either the standby/run state or the deep energy saving state as the slave.

As shown in FIG. 7, if a status transition of its own equipment occurs (YES in step 701) when the power supply state is in either the standby/run state or the deep energy saving state, the multifunction peripheral 100 acting as the slave transmits a notification of status transition to the multifunction peripheral 100 acting as the master (step 702).

Here, the "status change of the multifunction peripheral 100 acting as the slave" denotes the contents that are explained by reference to FIG. 6.

Then, when the calculation of the power consumption is executed in the multifunction peripheral 100 acting as the master and, as a result, the multifunction peripheral 100 that is acting as the slave now is decided as the next master, the notification of master change request is transmitted to the multifunction peripheral 100 that is decided as the slave.

As shown in FIG. 7, in some cases the multifunction peripheral 100 acting as the slave receives the notification of master change request transmitted from the multifunction peripheral 100 acting as the master (NO in step 701 to YES in step 703) in such a situation that the power supply state is in either the standby/run state or the deep energy saving state.

Also, in some cases the multifunction peripheral 100 acting as the slave receives the notification of master change request transmitted from the multifunction peripheral 100 acting as the master (step 702 to YES in step 703) after such multifunction peripheral transmits the notification of status transition to the master.

The multifunction peripheral 100 that received the notification of master change request receives the power consumption calculating table (step 704). Then, this multifunction peripheral 100 broadcasts the notification of master acquisition to the multifunction peripherals 100 in the network system 1 except its own equipment (step 705).

Then, the multifunction peripheral 100 that broadcasted the notification of master acquisition stores the identification information of its own equipment as the master in the NVRAM 104 as the identification information acting as the master (step 706).

In this manner, the multifunction peripheral 100 acting as the slave in the network system 1 acts as the master when such multifunction peripheral receives the notification of master change request that is transmitted from the multifunction peripheral 100 acting as the master.

Next, an example of an operation of the multifunction peripheral 100 in the network system 1 will be explained with reference to FIG. 8 and FIG. 9 hereunder.

First, as respective states of a plurality of multifunction peripherals 100 in the network system 1, the multifunction peripheral (A) 100-1 acting as the master is in the standby/run state, the multifunction peripheral (B) 100-2 acting as the slave is in the standby/run state, and the multifunction peripheral (C) 100-3 acting as the slave is in the energy saving state (the deep energy saving state).

Then, the standby state of the multifunction peripheral (B) 100-2 is continued and a predetermined time has elapsed from such states. Then, as shown in FIG. 8, the multifunction peripheral (B) 100-2 goes to the energy saving state from the standby/run state.

When the multifunction peripheral (B) 100-2 goes to the energy saving state, such multifunction peripheral (B) 100-2 transmits the notification of status transition to the multifunction peripheral (A) 100-1 because the status transition occurs (similar to the processes from YES in step 701 to step 702, which are explained by reference to FIG. 7).

Figure 8:
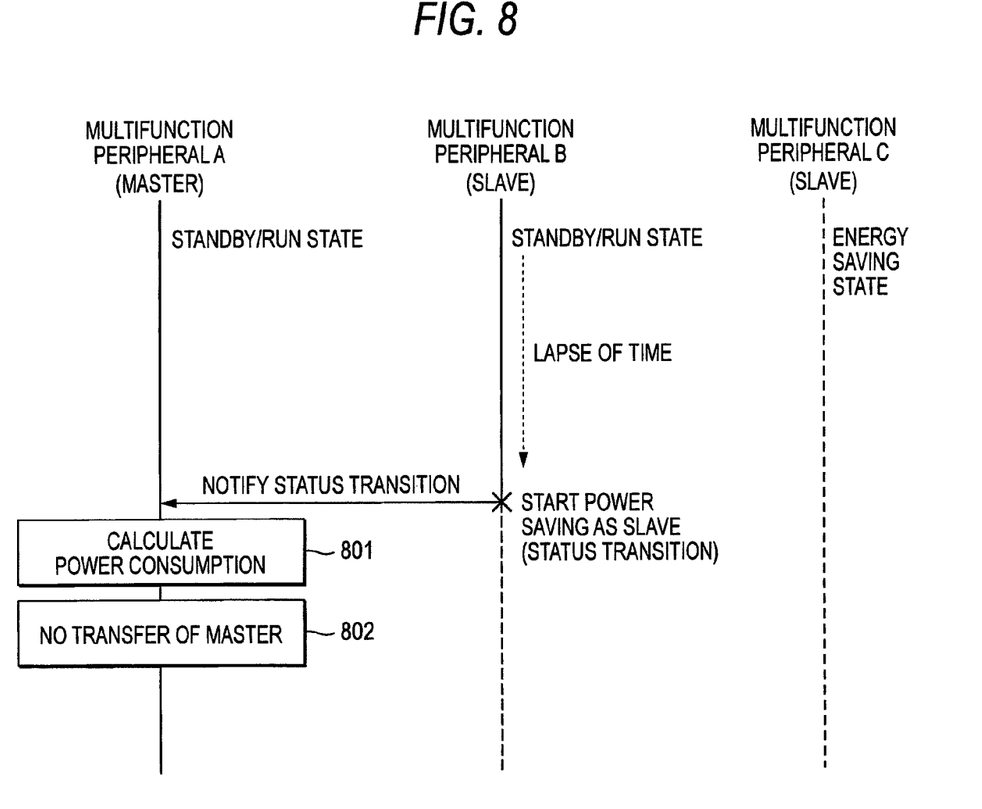
FIG. 8 is a view showing an operational example of the multifunction peripheral 100 in the network system 1.
Figure 9:
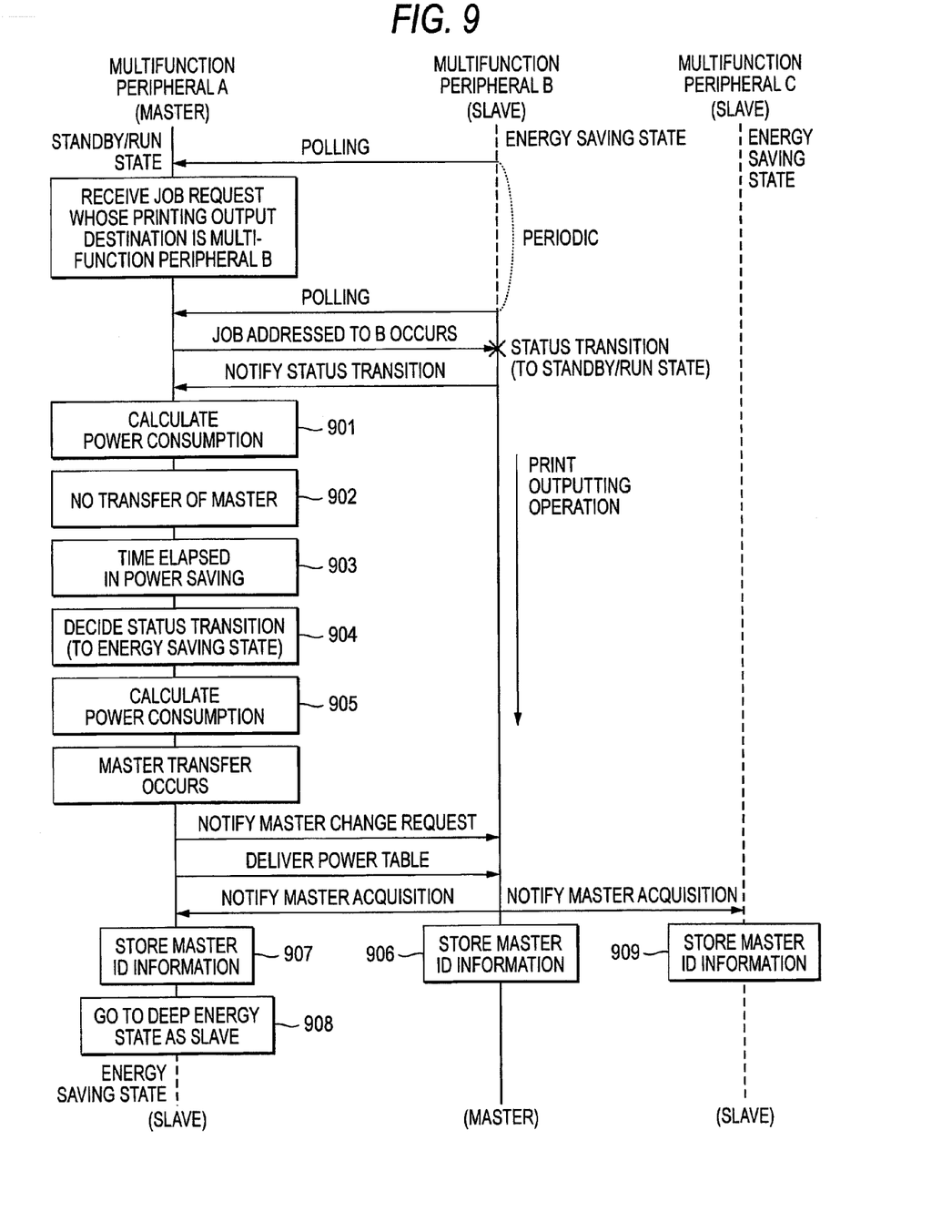
FIG. 9 is a view showing an operational example of the multifunction peripheral 100 in the network system 1.

As shown in FIG. 8, the master that received the notification of status transition from the slave executes the calculation of the power consumption (similar to the process in step 503 explained by reference to FIG. 6. Step 801 in FIG. 8).

Since the multifunction peripheral (A) 100-1 is in the standby/run state, the multifunction peripheral (B) 100-2 is in the energy saving state, and the multifunction peripheral (C) 100-3 is in the energy saving state, the contents of the calculation of the power consumption executed herein are given as 15 w+2 W+1 w=18 w when the multifunction peripheral (A) 100-1 acts as the master, given as 15 w+8 W+1 w=24 w when the multifunction peripheral (B) 100-2 acts as the master, and given as 15 w+2 W+8 w=25 w when the multifunction peripheral (C) 100-3 goes to the energy saving state. Since the overall power consumption is smallest when the multifunction peripheral (A) 100-1 acts as the master, the multifunction peripheral (A) 100-1 is decided as the master.

Then, since the master is the multifunction peripheral (A) 100-1 at a point of time the calculation of the power consumption is executed, no transfer of the master is caused (step 802).

The multifunction peripheral 100 acting as the slave in the energy saving state inquires periodically the multifunction peripheral 100 acting as the master by the polling to check whether or not the printing request whose printing outputting destination is its own equipment has been sent to the multifunction peripheral 100 acting as the master.

Thus, the multifunction peripheral (B) 100-2 inquires periodically the multifunction peripheral (A) 100-1 acting as the master by the polling.

As the result of the inquiry executed by the polling, when the printing request whose printing outputting destination is its own equipment (the multifunction peripheral (B) 100-2) has arrived at the multifunction peripheral 100 (the multifunction peripheral (A) 100-1) acting as the master, the multifunction peripheral (B) 100-2 receives the printing request whose printing outputting destination is its own equipment, from the multifunction peripheral 100 acting as the master.

The multifunction peripheral (B) 100-2 that received the printing request whose printing outputting destination is its own equipment goes to the standby/run state from the energy saving state. Then, such multifunction peripheral (B) 100-2 receives the print data corresponding to the printing request from the client PC 3, and executes the printing outputting operation.

When the multifunction peripheral (B) 100-2 goes to the standby state from the energy saving state, such multifunction peripheral transmits the notification of the status transition to the multifunction peripheral (A) 100-1 acting as the master.

The multifunction peripheral (A) 100-1 that received the notification of the status transition executes the calculation of the power consumption (step 901).

Since the multifunction peripheral (A) 100-1 is in the standby/run state, the multifunction peripheral (B) 100-2 is in the standby/run state, and the multifunction peripheral (C) 100-3 is in the energy saving state, the contents of the calculation of the power consumption executed in step 901 are given as 15 w+13 W+1 w=29 w when the multifunction peripheral (A) 100-1 acts as the master, given as 15 w+13 W+1 w=29 w when the multifunction peripheral (B) 100-2 acts as the master, and given as 15 w+13 W+8 w=36 w when the multifunction peripheral (C) 100-3 goes to the energy saving state. Since the overall power consumption is smallest when the multifunction peripheral (A) 100-1 or the multifunction peripheral (B) 100-2 acts as the master, the multifunction peripheral (A) 100-1 or the multifunction peripheral (B) 100-2 is decided as the master.

Since the master is the multifunction peripheral (A) 100-1 at a point of time the calculation of the power consumption is executed, no transfer of the master is caused (step 902).

Then, when the standby state of the multifunction peripheral (A) 100-1 acting as the master is continued for a predetermined time (step 903), the power state of the multifunction peripheral (A) 100-1 is decided to go to the energy saving state from the standby/run state (step 904).

Since the power state of the multifunction peripheral (A) 100-1 acting as the master is decided to go to the energy saving state from the standby/run state, it is decided that a status transition occurs in the multifunction peripheral 100 acting as the master (YES in step 502 explained by reference to FIG. 5), and thus the calculation of the power consumption is executed (similar to the process in step 503 explained by reference to FIG. 5. Step 905 in FIG. 9).

Since the multifunction peripheral (A) 100-1 is in the energy saving state, the multifunction peripheral (B) 100-2 is in the standby/run state, and the multifunction peripheral (C) 100-3 is in the energy saving state, the contents of the calculation of the power consumption executed in step 905 are given as 10 w+13 W+1 w=24 w when the multifunction peripheral (A) 100-1 acts as the master, given as 2 w+13 W+1 w=16 w when the multifunction peripheral (B) 100-2 acts as the master, and given as 2 w+13 W+8 w=23 w when the multifunction peripheral (C) 100-3 goes to the energy saving state. Since the overall power consumption is smallest when the multifunction peripheral (B) 100-2 acts as the master, the multifunction peripheral (B) 100-2 is decided as the master.

When the multifunction peripheral (B) 100-2 is decided as the next master, the multifunction peripheral (A) 100-1 transmits the notification of the master change request and the power consumption calculating table to the multifunction peripheral (B) 100-2 that acts as the next master.

When the multifunction peripheral (B) 100-2 acting as the next master received the notification of the master change request and the power consumption calculating table, such multifunction peripheral (B) 100-2 broadcasts the notification of the master acquisition to the multifunction peripheral (A) 100-1 and the multifunction peripheral (C) 100-3. Also, such multifunction peripheral (B) 100-2 stores identification information of its own equipment acting as the master in the NVRAM 104 as the identification information of the multifunction peripheral 100 acting as the master (step 906).

Then, the multifunction peripheral (A) 100-1 that received the notification of the master acquisition stores the identification information of the multifunction peripheral (B) 100-2 recited in the notification of the master acquisition to act as the master in the NVRAM 104, as the identification information of the multifunction peripheral 100 acting as the master (step 907).

Then, the multifunction peripheral (A) 100-1 decides that its own equipment is the slave, based on the identification information of the multifunction peripheral 100 (the multifunction peripheral (B) 100-2) stored in the NVRAM 104, and then goes to the deep energy state (step 908).

Also, the multifunction peripheral (C) 100-3 receives the notification of the master acquisition that is broadcasted from the multifunction peripheral (B) 100-2, and stores the identification information of the multifunction peripheral (B) 100-2 in the NVRAM 104 as the identification information of the multifunction peripheral 100 acting as the master (step 909).

In this case, explanation is made such that the periodic polling, by which the multifunction peripheral 100 in the energy saving state inquires the multifunction peripheral 100 acting as the master to check whether or not the printing request whose printing outputting destination is its own equipment has been arrived at the multifunction peripheral 100 acting as the master, is executed by the multifunction peripheral (B) 100-2. But such periodic polling may be executed by the multifunction peripheral (C) 100-3 that is in the energy saving state.

In this case, the process in which the multifunction peripheral 100 in the energy saving state issues periodically the polling to the multifunction peripheral 100 acting as the master may be executed after the multifunction peripheral 100 goes to the shallow energy saving state from the deep energy saving state during the polling operation.

This invention is available for the image forming system, the image forming apparatus, and the computer readable medium.

Also, the similar advantages to those of the above embodiment can be achieved by supplying the memory medium in which the information processing program used to implement the functions of the above embodiment is recorded, and then reading and executing the program stored in the memory medium by the communication equipment, or the like. As the memory medium used to supply the program, for example, CD-ROM (Compact Disk Read Only Memory), DVD (Digital Versatile Disk), SD card (Secure Digital memory card), etc. may be employed, or the server for supplying the program may be employed.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system, comprising:
a plurality of image forming apparatuses that communicate with each other via a network;
wherein operation states of respective image forming apparatuses are switched in the network such that one image forming apparatus acts as a main apparatus and other image forming apparatuses act as subordinate apparatuses, and
wherein each of the image forming apparatuses includes:
a network controller that controls a communication with another image forming apparatus;
a power saving controller that applies a power saving control in a first power saving mode in which a supply of power to a printing function portion that forms an image on a sheet is stopped and a power is fed to the network controller when the apparatus acts as the main apparatus, and applying a power saving control in a second power saving mode in which a supply of power to the printing function portion and the network controller is stopped when the apparatus acts as the subordinate apparatus; and
a main apparatus deciding unit that decides the image forming apparatus to act next as the main apparatus, out of the plurality of image forming apparatuses based on a calculation of power consumption of the plurality of image forming apparatuses when a power state of any image forming apparatus of the plurality of image forming apparatuses shifts from either the first power saving mode or the second power saving mode to a non-power saving mode in which a power is fed to the printing function portion and the network controller or when a power state of any image forming apparatus of the plurality of image forming apparatuses shifts from the non-power saving mode to either the first power saving mode or the second power saving mode, and
wherein the image forming apparatus decided by the main apparatus deciding unit acts as the main apparatus after the image forming apparatus to act as the main apparatus is decided by the main apparatus deciding unit.

2. The image forming system according to claim 1, wherein a processing of the main apparatus deciding unit is executed by the image forming apparatus acting as the main apparatus.

3. The image forming system according to claim 1, wherein the main apparatus deciding unit calculates a total of power consumption of the plurality of image forming apparatuses in respective cases where the image forming apparatuses act sequentially as the main apparatus, and then decides the image forming apparatus, to act next as the main apparatus when the total of power consumption is smallest, as the image forming apparatus acting next as the main apparatus.

4. The image forming system according to claim 3, wherein the image forming apparatus acting as the main apparatus has a power consumption calculating table in which information about the power consumption in the first power saving mode, the power consumption in the second power saving mode, and the power consumption in the non-power saving mode are held respectively.

5. The image forming system according to claim 4, wherein the image forming apparatus acting as the main apparatus transmits the power consumption calculating table to the image forming apparatus that is decided by the main apparatus deciding unit.

6. The image forming system according to claim 1, wherein, the image forming apparatus acting as the subordinate apparatus, when a power state thereof shifts from either the first power saving mode or the second power saving mode to the non-power saving mode or when a power state thereof shifts from the non-power saving mode to either the first power saving mode or the second power saving mode, transmits a notification of status transition to the image forming apparatus acting as the main apparatus, and
the main apparatus deciding unit decides the image forming apparatus to act next as the main apparatus after the image forming apparatus acting as the main apparatus receives the notification of status transition from the image forming apparatus acting as the subordinate apparatus.

7. The image forming system according to claim 1, wherein the main apparatus deciding unit decides the image forming apparatus to act next as the main apparatus after the power state of the image forming apparatus acting as the main apparatus shifts from the first power saving mode to the non-power saving mode or shifts from the non-power saving mode to the first power saving mode.

8. The image forming system according to claim 1, further comprising:
an inquiring unit that shifts temporarily to the first power saving mode from the second power saving mode when the image forming apparatus acts as the subordinate apparatus, and inquires the main apparatus of a printing job addressed to the image forming apparatus acting as the subordinate apparatus;
a distributing unit that distributes the printing job in response to the inquiry from the subordinate apparatus as a destination when the image forming apparatus that acts as the main apparatus receives the printing job;
a printing unit that shifts to the non-power saving mode when the image forming apparatus that acts as the subordinate apparatus receives the printing job from the image forming apparatus acting as the main apparatus, and prints the received printing job;
a transmitting unit that transmits a notification of a main apparatus request when the image forming apparatus that is decided by the main apparatus deciding unit corresponds to the image forming apparatus acting as the subordinate apparatus while the image forming apparatus acts as the main apparatus; and
a main apparatus declaring unit that transmits a main apparatus declaration to other image forming apparatuses connected to the network when the image forming apparatus receives the notification of main apparatus request.

9. An image forming apparatus connected to a network in which operation states of respective image forming apparatuses are switched such that one image forming apparatus acts as a main apparatus and other image forming apparatuses act as subordinate apparatuses, the image forming apparatus comprising:
a network controller that controls a communication with another image forming apparatus;
a power saving controller that applies a power saving control in a first power saving mode in which a supply of power to a printing function portion that forms an image on a sheet is stopped and a power is fed to the network controller when the apparatus acts as the main apparatus, and that applies a power saving control in a second power saving mode in which a supply of power to the printing function portion and the network controller is stopped when the apparatus acts as the subordinate apparatus; and a main apparatus deciding unit that decides the image forming apparatus to act next as the main apparatus, out of the image forming apparatuses connected to the network based on a calculation of power consumption of the image forming apparatuses connected to the network when a power state of any image forming apparatus connected to the network shifts from either the first power saving mode or the second power saving mode to a non-power saving mode in which a power is fed to the printing function portion and the network controller or when a power state of any image forming apparatus connected to the network shifts from the non-power saving mode to either the first power saving mode or the second power saving mode while the image forming apparatus acts as the main apparatus, wherein a charge of the main apparatus is transferred to the decided image forming apparatus when the image forming apparatus is decided by the main apparatus deciding unit corresponds to the image forming apparatuses except the image forming apparatus acting as the subordinate apparatus.

10. The image forming apparatus according to claim 9, further comprising:

a transmitting unit that transmits a notification of status transition to the image forming apparatus that acts as the main apparatus when a power state of the image forming apparatus acting as the subordinate apparatus shifts from either the first power saving mode or the second power saving mode to the non-power saving mode or when a power state thereof shifts from the non-power saving mode to either the first power saving mode or the second power saving mode;

wherein the main apparatus deciding unit decides the image forming apparatus to act next as the main apparatus after the image forming apparatus receives the notification of status transition transmitted from the transmitting unit.

11. A computer readable medium storing a program causing a computer to execute a process for use in an image forming apparatus connected to a network in which operation states of respective image forming apparatuses are switched such that one image forming apparatus acts as a main apparatus and other image forming apparatuses act as subordinate apparatuses, applying a power saving control in a first power saving mode in which a supply of power to a printing function portion that forms an image on a sheet is stopped and a power is fed to a network controller that controls a communication with another image forming apparatus when the apparatus acts as the main apparatus, and applying a power saving control in a second power saving mode in which a supply of power to the printing function portion and the network controller is stopped when the apparatus acts as the subordinate apparatus, deciding the image forming apparatus to act next as the main apparatus, out of the image forming apparatuses connected to the network based on a calculation of power consumption of the image forming apparatuses connected to the network when a power state of any image forming apparatus connected to the network shifts from either the first power saving mode or the second power saving mode to a non-power saving mode in which a power is fed to the printing function portion and the network controller or when a power state of any image forming apparatus connected to the network shifts from the non-power saving mode to either the first power saving mode or the second power saving mode while the image forming apparatus acts as the main apparatus, and transferring a charge of the main apparatus to the decided image forming apparatus when the image forming apparatus is decided by the deciding corresponds to the image forming apparatuses except the image forming apparatus acting as the subordinate apparatus.

12. The computer readable medium according to claim 11, further comprising:

transmitting a notification of status transition to the image forming apparatus that acts as the main apparatus when a power state of the image forming apparatus acting as the subordinate apparatus shifts from either the first power saving mode or the second power saving mode to the non-power saving mode or when a power state thereof shifts from the non-power saving mode to either the first power saving mode or the second power saving mode;

whereby the main apparatus deciding unit decides the image forming apparatus to act next as the main apparatus after the image forming apparatus receives the notification of status transition transmitted from the transmitting unit.

* * * * *